US011381116B2

(12) United States Patent
Choi

(10) Patent No.: US 11,381,116 B2
(45) Date of Patent: Jul. 5, 2022

(54) DISPLAY SYSTEM FOR WIRELESSLY SUPPLYING POWER

(71) Applicant: SAMSUNG ELECTRONICS CO., LTD., Suwon-si (KR)

(72) Inventor: Youngho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

(21) Appl. No.: 16/979,081

(22) PCT Filed: Mar. 14, 2019

(86) PCT No.: PCT/KR2019/002942
§ 371 (c)(1),
(2) Date: Sep. 8, 2020

(87) PCT Pub. No.: WO2019/203445
PCT Pub. Date: Oct. 24, 2019

(65) Prior Publication Data
US 2020/0412176 A1    Dec. 31, 2020

(30) Foreign Application Priority Data
Apr. 18, 2018  (KR) .................. 10-2018-0045218

(51) Int. Cl.
H02J 50/50         (2016.01)
H02J 50/12         (2016.01)
(Continued)

(52) U.S. Cl.
CPC ............ H02J 50/50 (2016.02); G06F 1/1605 (2013.01); G06F 1/266 (2013.01); H02J 50/12 (2016.02); H02J 2310/12 (2020.01); H04R 3/00 (2013.01)

(58) Field of Classification Search
CPC ........ H02J 50/50; H02J 50/12; H02J 2310/12; G06F 1/1605; G06F 1/266; G06F 1/26; H04R 3/00
See application file for complete search history.

(56) References Cited

U.S. PATENT DOCUMENTS 8,823,215 B2 *   9/2014  Park .................. H02J 7/025
                                            307/104
9,086,864 B2     7/2015  Culbert et al.
(Continued)

FOREIGN PATENT DOCUMENTS

KR   10-2013-0050094 A   5/2013
KR   10-2013-0123842 A   11/2013
(Continued)

OTHER PUBLICATIONS

Yang ,"Constant Current Power Amplifier for MHz Magnetic Resonance Wireless Power Transfer Systems" 2017 IEEE MTT-S International Microwave Symposium (IMS), pp. 1050-1052, 2017 (Year: 2017).*
(Continued)

Primary Examiner — Pinping Sun
(74) Attorney, Agent, or Firm — Sughrue Mion, PLLC

(57) ABSTRACT

A display system may include a wireless power transmitter that converts power supplied from a power source unit into a first magnetic field and to transmit a first power signal to a speaker; the speaker including a wireless power transmission/reception circuit that converts the first power signal received from the wireless power transmitter into a first current, and to generate a second magnetic field by the first current to transmit a second power signal to a display, a distribution circuit that distributes power received through the first power signal to a sound output unit by distributing the first current and outputting a second current, and the sound output unit that outputs sound using power supplied (Continued)

from the distribution circuit; and the display including a wireless power reception circuit that converts the second power signal received from the speaker into a third current, and an image output unit that outputs an image by using power transferred through the third current.

13 Claims, 6 Drawing Sheets

(51) Int. Cl.
    *G06F 1/16*      (2006.01)
    *G06F 1/26*      (2006.01)
    *H04R 3/00*      (2006.01)

(56) References Cited

U.S. PATENT DOCUMENTS

| | | | |
|---|---|---|---|
| 9,343,910 B2 | 5/2016 | Akuzawa et al. | |
| 10,199,873 B2 | 2/2019 | Culbert et al. | |
| 10,416,252 B2 * | 9/2019 | Liu | H02J 7/025 |
| 10,700,544 B2 | 6/2020 | Park et al. | |
| 2012/0169131 A1 * | 7/2012 | Choudhary | H02M 7/48 |
| | | | 307/104 |
| 2013/0026981 A1 * | 1/2013 | Van Der Lee | H02J 50/80 |
| | | | 320/108 |
| 2013/0113298 A1 * | 5/2013 | Ryu | H02J 50/40 |
| | | | 307/104 |
| 2013/0342025 A1 * | 12/2013 | Cook | H02J 7/00045 |
| | | | 307/104 |
| 2015/0280444 A1 * | 10/2015 | Smith | H02J 7/025 |
| | | | 307/104 |
| 2016/0126745 A1 * | 5/2016 | Lee | H02J 50/10 |
| | | | 307/104 |
| 2016/0301258 A1 * | 10/2016 | Zeine | H02J 50/20 |
| 2018/0048178 A1 * | 2/2018 | Leabman | H04B 1/04 |
| 2018/0269725 A1 * | 9/2018 | Yeo | H02J 50/12 |
| 2020/0280216 A1 * | 9/2020 | Pei | H02J 50/90 |

FOREIGN PATENT DOCUMENTS

| | | | |
|---|---|---|---|
| KR | 10-1403596 B1 | 6/2014 | |
| KR | 10-2015-0055087 A | 5/2015 | |
| KR | 10-2016-0017626 A | 2/2016 | |
| KR | 10-2019-0021147 A | 3/2019 | |
| WO | 2011/062827 A2 | 5/2011 | |
| WO | 2012/150746 A1 | 11/2012 | |
| WO | WO-2013069951 A1 * | 5/2013 | H02J 50/12 |
| WO | WO-2013165165 A1 * | 11/2013 | H04B 5/0075 |
| WO | WO-2017148086 A1 * | 9/2017 | H02J 50/12 |

OTHER PUBLICATIONS

International Search Report dated Jul. 5, 2019 (PCT/ISA/210) issued by the International Searching Authority for International Application No. PCT/KR2019/002942.
Written Opinion dated Jul. 5, 2019 (PCT/ISA/237) issued by the International Searching Authority for International Application No. PCT/KR2019/002942.

* cited by examiner

DISPLAY SYSTEM FOR WIRELESSLY SUPPLYING POWER

CROSS-REFERENCE TO RELATED APPLICATIONS

This application is a National Phase Entry of PCT International Application No. PCT/KR2019/002942, filed on Mar. 14, 2019, which claims priority to Korean Patent Application No. 10-2018-0045218 filed on Apr. 18, 2018, the contents of all of which are incorporated herein by reference in their entirety.

TECHNICAL FIELD

Embodiments disclosed in the disclosure relate to a technique for transmitting wireless power.

BACKGROUND ART

Recently, wireless power transmission technology that may supply power without using wires has been attracting attention. As wireless power transmission technology advances, it is easier to supply energy to the display.

In the wireless power transmission using magnetic resonance, power is supplied from an AC source to generate an AC current in a transmission coil, and a resonant coil is coupled to the transmission coil to transmit power by the resonant coil. The wireless power transmission by the magnetic resonance may transmit power farther than an electromagnetic induction method, but its transmittable distance is still short, so many improvements are necessary.

DISCLOSURE

Technical Problem

In a display system, as the distance from a wireless power transmitter to a component (e.g., speaker, or display) for outputting content increases, since the power transmission (or reception) efficiency is significantly reduced, the component may be difficult to place beyond a specified distance from the wireless power transmitter. When a coil is wound around a thick magnetic material to improve power reception efficiency, the thickness of the display itself may be thickened. In addition, when the display system further includes a separate repeater to increase the distance between the wireless power transmitter and the component, not only does the production cost increase, but also the volume of the display system may increase.

Meanwhile, when a sound bar separated from the display is used as a repeater, due to a load of the component for outputting sound, it is difficult to generate a power signal having a sufficient magnitude for transferring power, or as a resonance point for receiving the generated signal is changed, a transfer efficiency may be significantly reduced.

According to various embodiments of the disclosure, a display system may increase power transmission and reception efficiency by generating a power signal having a sufficient magnitude to transfer power at a uniform resonance point while using a speaker as a repeater.

Technical Solution

A display system according to an embodiment disclosed in the disclosure includes a wireless power transmitter that converts power supplied from a power source unit into a first magnetic field and to transmit a first power signal to a speaker; the speaker including a wireless power transmission/reception circuit that converts the first power signal received from the wireless power transmitter into a first current, and to generate a second magnetic field by the first current to transmit a second power signal to a display, a distribution circuit that distributes power received through the first power signal to a sound output unit by distributing the first current and outputting a second current, and the sound output unit that outputs sound using power supplied from the distribution circuit; and the display including a wireless power reception circuit that converts the second power signal received from the speaker into a third current, and an image output unit that outputs an image by using power transferred through the third current.

In addition, a display system according to an embodiment disclosed in the disclosure includes a wireless power transmitter that converts power supplied from a power source unit into a first magnetic field and to transmit a first power signal to a speaker; the speaker including a first wireless power reception circuit that converts the first power signal received from the wireless power transmitter into a first current, a distribution circuit that distributes power received through the first power signal to a sound output unit and a first wireless power transmission circuit by distributing the first current and outputting a second current, the sound output unit that outputs sound using a first power distributed by the distribution circuit, and the first wireless power transmission circuit that converts a second power distributed by the distribution circuit into a second magnetic field to transmit a second power signal to a display; and the display including a second wireless power reception circuit that converts the second power signal received from the speaker into a third current, and an image output unit that outputs an image by using power transferred through the third current.

In addition, a wireless power repeating apparatus according to an embodiment disclosed in the disclosure includes a wireless power transmission/reception circuit that converts a first power signal received from a first external device through a first magnetic field into a first current, to generate a second magnetic field by the first current to transmit a second power signal to a second external device, a distribution circuit that distributes power received through the first power signal to a load unit by distributing the first current and outputting a second current, and the load unit that performs a function by using the power supplied from the distribution circuit.

In addition, a wireless power repeating apparatus according to an embodiment disclosed in the disclosure includes a wireless power reception circuit that converts a first power signal received from a first external device through a first magnetic field into a first current, a distribution circuit that distributes power received through the first power signal to a load unit and a wireless power transmission circuit by distributing the first current and outputting a second current, the load unit that performs a function by using a first power distributed by the distribution circuit, and the wireless power transmission circuit that converts a second power distributed by the distribution circuit into a second magnetic field to transmit a second power signal to a display.

Advantageous Effects

According to an exemplary embodiment of the disclosure, a display system may improve the appearance of the display system by allowing the display that receives power wirelessly to be spaced over a specified distance from the power transmitter, using a speaker placed close to the display as a wireless power repeater.

In addition, by placing a circuit that transmits power for performing an operation of outputting sound to a speaker used as a repeater, the speaker may smoothly repeat power to the display while supplying power for internal operation.

In addition, various effects may be provided that are directly or indirectly identified through this document.

DESCRIPTION OF DRAWINGS

In connection with the description of the drawings, the same or similar reference numerals may be used for the same or similar components.

MODE FOR INVENTION

Figure 1:
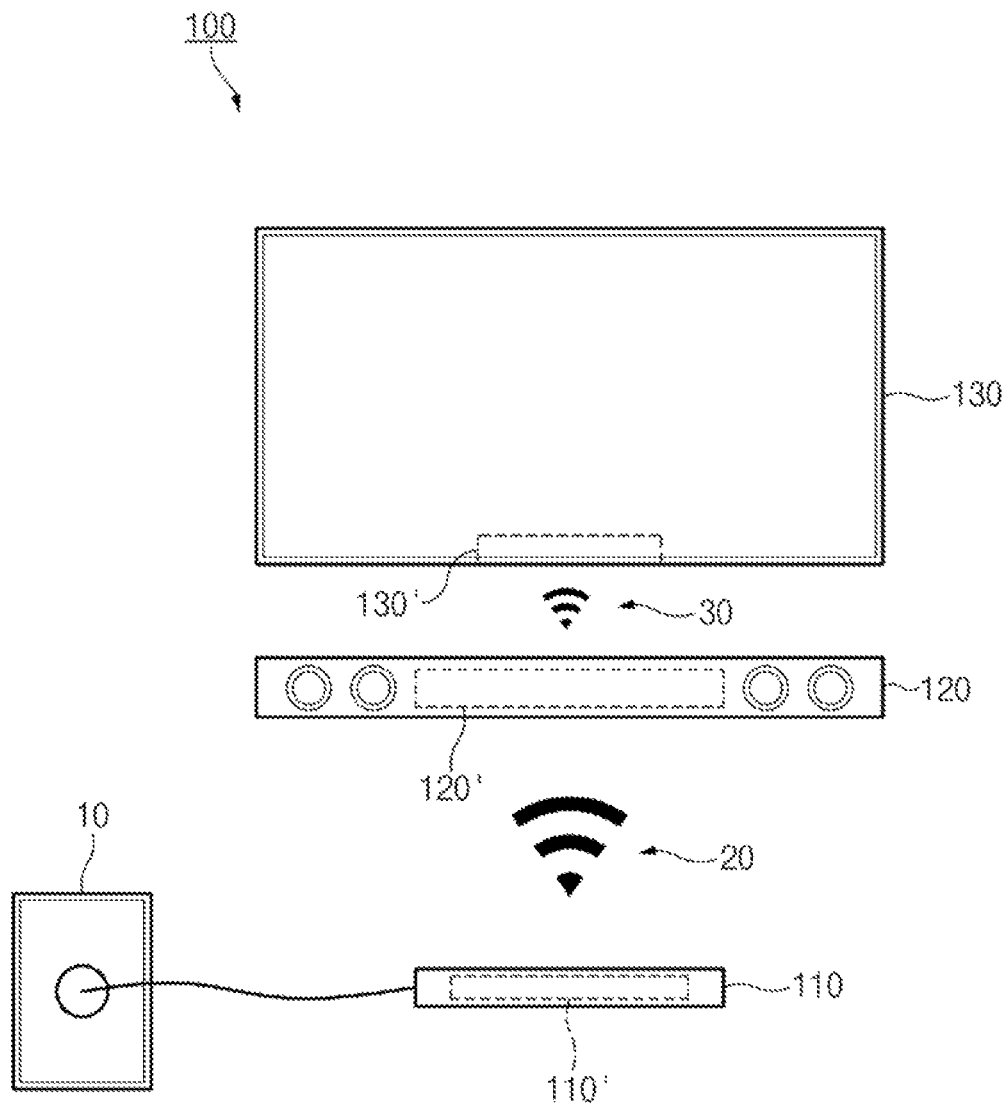
FIG. 1 is a diagram illustrating a display system according to various embodiments.

Hereinafter, various embodiments of the disclosure will be described with reference to the accompanying drawings. However, this is not intended to limit the disclosure to specific embodiments, and it should be understood that the disclosure includes various modifications, equivalents, and/or alternatives. In connection with the description of the drawings, similar reference numerals may be used for similar components.

FIG. 1 is a diagram illustrating a display system according to various embodiments.

Referring to FIG. 1, a display system 100 may include a wireless power transmitter 110, a speaker 120, and a display 130. The display system 100 may output content by transmitting and receiving wireless power in each component included in the display system 100. The content may be stored, for example, in the display system 100, or may be received from an external device (e.g., a set-top box, a DVD player, etc.). The content may include image information and sound information.

According to one embodiment, the display system 100 may transmit power wirelessly to each component for displaying the content.

According to one embodiment, the wireless power transmitter 110 may be connected to an external power source 10 to receive power. The external power source 10 may supply, for example, an AC voltage within a specified range (e.g., 85 V to 256 V) as a wall power (or commercial power) to the display system 100.

According to an embodiment, the wireless power transmitter 110 may transmit power supplied from the external power source 10 to an external device. For example, the wireless power transmitter 110 may transmit a first power signal 20 to the external device (e.g., the speaker 120) using the input power (or supplied power). The first power signal 20 may be, for example, a signal for wirelessly transmitting power generated by the input power (e.g., the external power source 10). According to an embodiment, the wireless power transmitter 110 may generate the first power signal 20 by generating a magnetic field through a first coil 110'. Accordingly, the wireless power transmitter 110 may convert power supplied from the external power source 10 into the magnetic field (or a first magnetic field) and may transmit the converted power to the speaker 120 through the first power signal 20.

According to one embodiment, the wireless power transmitter 110 may supply power to the external device through a wire as well as wirelessly. For example, the wireless power transmitter 110 may supply power to the external device connected wiredly. The external device may be, for example, a device for performing an additional function (e.g., a camera function).

According to an embodiment, the speaker 120 may repeat power transmitted from the wireless power transmitter 110 and may transfer the power to the external device. For example, the speaker 120 may receive the first power signal 20 from the wireless power transmitter 110 and may transmit a second power signal 30 to an external device, using the received first power signal 20. The second power signal 30 may be generated by using, for example, a part of power received through the first power signal 20. According to an embodiment, an induced electromotive force may be generated due to the magnetic field generated by the wireless power transmitter 110 in a second coil 120' of the speaker 120, and the magnetic field may be generated from the generated induced electromotive force to repeat the power.

According to one embodiment, the speaker 120 may output a specified sound. For example, the speaker 120 may output sound included in the content using a part of the first power signal 20 received from the wireless power transmitter 110. Accordingly, the speaker 120 may output the specified sound while repeating the power to the external device.

According to one embodiment, the speaker 120 is a wireless power repeating apparatus that repeats the power signal (e.g., the first power signal 20) transmitted from the wireless power transmitter 110 and may transmit the power signal to the display 130. In addition, the wireless power repeating apparatus may output the sound included in the content.

According to one embodiment, the display 130 may receive power from the speaker 120. The display 130 may receive power transferred (or repeated) through the speaker 120. For example, the display 130 may receive the second power signal 30. According to an embodiment, the display 130 may receive the second power signal 30 by generating the induced electromotive force in a third coil 130' that resonates with the magnetic field generated by the speaker 120.

According to one embodiment, the display 130 may output a specified image using the received power signal (e.g., the second power signal 30). The specified image may be an image included in the content.

As a distance from the wireless power transmitter 110 to a component (e.g., the speaker 120 or the display 130) for outputting the content increases, a power transmission (or reception) efficiency of the display system 100 may be significantly decreased. Accordingly, the component may be difficult to be placed beyond a specified distance from the wireless power transmitter 110. When a coil is wound around a thick magnetic material to improve the power reception efficiency, the thickness of the display 130 itself may be thickened. In addition, when the display system 100 further includes a separate repeater to increase the distance between the wireless power transmitter 110 and the component, not only does the production cost increase, but also the volume of the display system 100 may increase. When the speaker 120 of the display system 100 is separated from the display 130 and disposed in the form of a sound bar, and the speaker 120 is used as a repeater, it is difficult to generate a power signal having a sufficient magnitude for transmitting power due to the load on the component for outputting the sound, or since a resonance point for receiving the generated signal is changed, the transfer efficiency may be significantly reduced. However, the display system 100 according to various embodiments of the disclosure may generate the power signal having the sufficient magnitude to transmit power at a uniform resonance point, and may increase the transmission/reception efficiency of power, while using the speaker 120 as the repeater.

Figure 2:
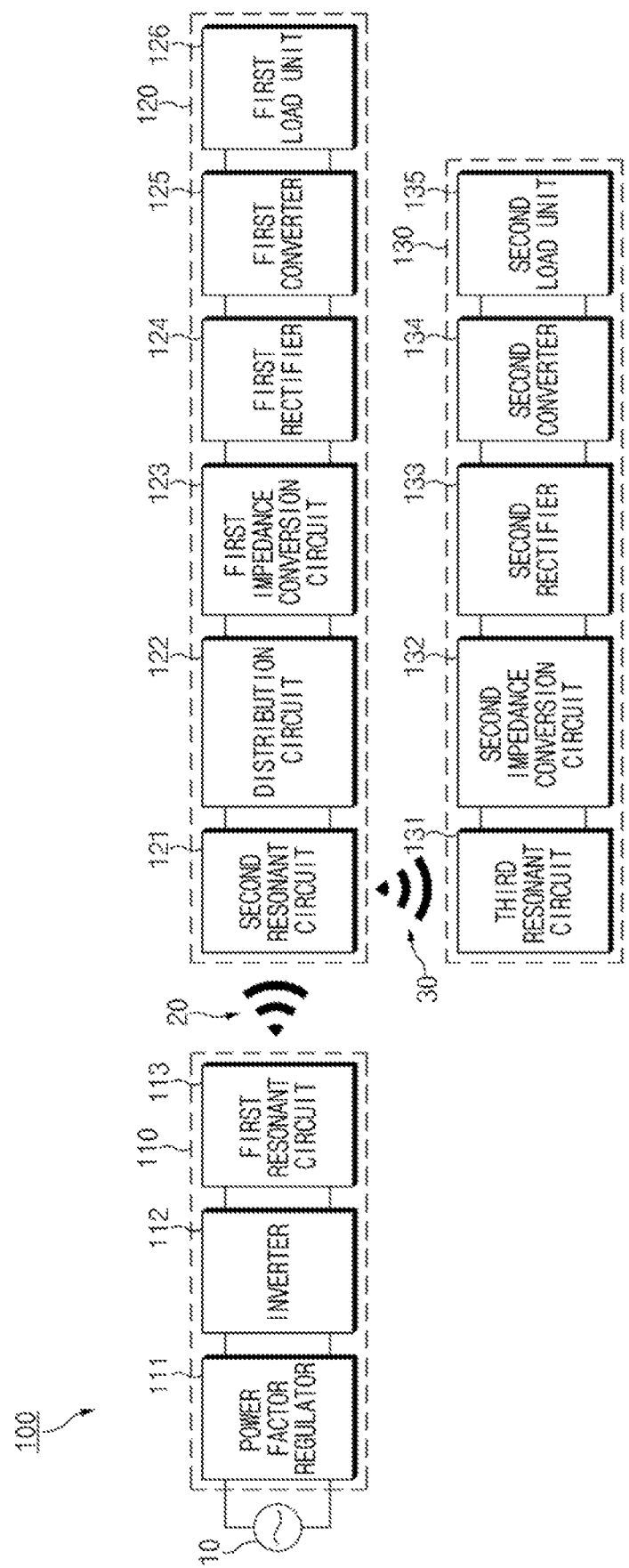
FIG. 2 is a block diagram illustrating a configuration of a display system according to an embodiment.

FIG. 2 is a block diagram illustrating a configuration of a display system according to an embodiment.

Referring to FIG. 2, the wireless power transmitter 110 of the display system 100 may include a power factor regulator 111, an inverter 112, and a first resonant circuit 113 (or wireless power transmission circuit). The wireless power transmitter 110 may transmit power supplied from the external power source 10 to the speaker 120 through the power factor regulator 111, the inverter 112, and the first resonant circuit 113. In the wireless power transmitter 110, an additional configuration for wirelessly transmitting power may be included, or some configurations may be omitted.

According to an embodiment, the power factor regulator 111 may output a specified voltage by adjusting a power factor of power supplied from the external power source 10. For example, the power factor regulator 111 may change the power factor to close to 1 by matching a phase of a voltage and a phase of a current of a rectified AC voltage, and may output a DC voltage through a capacitor connected to an output end.

According to an embodiment, the inverter 112 may change the DC voltage input from the power factor regulator 111 to the AC voltage. The inverter 112 may include a PWM circuit for a pulse width modulation (PWM). According to an embodiment, a controller (not illustrated) of the wireless power transmitter 110 may control the inverter 112 to determine a frequency of an output voltage. For example, the controller may determine the frequency (or switching frequency) of the output voltage by changing a duty ratio of a control signal input to a switch of the PWM circuit. The controller may control an on-off period of the switch of the PWM circuit to determine the frequency of the output voltage.

According to an embodiment, the first resonant circuit 113 may transmit the first power signal 20 of a specified frequency (or operating frequency) to the speaker 120, using a voltage applied from the inverter 112. The specified frequency may be, for example, a frequency (or switching frequency) of the voltage output from the inverter 112.

According to an embodiment, the speaker 120 may include a second resonant circuit 121 (or wireless power transmission/reception circuit), a distribution circuit 122, a first impedance conversion circuit 123, a first rectifier 124, a first converter 125, and a first load unit 126. The speaker 120 may repeat a part of the power transferred from the wireless power transmitter 110 to the display 130 through the second resonant circuit 121, the distribution circuit 122, the impedance conversion circuit 123, the first rectifier 124, the first converter 125, and the first load unit 126, and may output the specified sound by using the remaining power. An additional configuration for repeating a power signal or outputting the sound may be included to the speaker 120, or some configuration may be omitted.

According to an embodiment, the second resonant circuit 121 may receive the first power signal 20 from the first resonant circuit 113. For example, the second resonant circuit 121 may receive the first power signal 20 by resonating at a frequency of the first power signal 20. The second resonant circuit 121 may resonate at the frequency of the first power signal 20 by adjusting values of an inductor and of a capacitor.

According to one embodiment, the second resonant circuit 121 may transmit a part of the received power to the display 130. The second resonant circuit 121 may repeat (or transfer) power received from the wireless power transmitter 110 to the display 130. For example, the second resonant circuit 121 may transmit the second power signal 30 of a specified frequency using a part of the first power signal 20 received from the wireless power transmitter 110. The specified frequency may be, for example, the frequency of the received first power signal 20.

According to an embodiment, the second resonant circuit 121 may supply a part (e.g., the remaining part) of the received power to the first load unit 126. The second resonant circuit 121 may supply a portion of the received power into the speaker 120 to output a specified sound.

According to an embodiment, the distribution circuit 122 may be connected to the second resonant circuit 121 to transfer the supplied power to the first load unit 126. According to an embodiment, the distribution circuit 122 may prevent the resonance frequency of the second resonant circuit 121 from being changed by an operation of outputting the sound of the first load unit 126, and may allow a repeat operation for transmitting and receiving wireless power to be stably performed. The distribution circuit 122 may electrically separate the second resonant circuit 121 from the first load unit 126.

According to one embodiment, the first impedance conversion circuit 123 may be connected to the distribution circuit 122, may change an impedance of the distribution circuit 122 such that an amount of change in the current supplied to the first load unit 126 by the part of the received power signal becomes a minimum. For example, the first impedance conversion circuit 123 may change the impedance of the distribution circuit 122 such that a current flowing through the second resonant circuit 121, which may be changed by the operation of the first load unit 126 and the amount of change in the distribution circuit of the current supplied to the first load unit 126 become the minimum. The first impedance conversion circuit 123 is connected to an output end of the distribution circuit 122 to convert (transduce) the impedance of the distribution circuit 122. According to an embodiment, the first impedance conversion circuit 123 may change the impedance of the distribution circuit 122 depending on the first load unit 126. For example, the first impedance conversion circuit 123 may change the impedance of the distribution circuit 122 depending on an output capacity of the first load unit 126.

According to one embodiment, the first rectifier 124 may rectify the AC voltage input from the distribution circuit 122 and the impedance conversion circuit 123 to generate a DC voltage. According to an embodiment, a capacitor for generating the DC voltage may be connected to an output end of the first rectifier 124.

According to one embodiment, the first converter 125 may adjust the DC voltage input from the first rectifier 124 to match the capacity of the first load unit 126. For example, the first converter 125 may adjust the level of the DC voltage and may supply the DC voltage having the adjusted level to the first load unit 126. According to an embodiment, the first converter 125 may be a DC/DC converter. According to an embodiment, the first converter 125 may output a specified DC voltage.

According to an embodiment, the first load unit 126 (or sound output unit) may output a specified sound using the voltage input from the first converter 125. The first load unit 126 may receive a part of the power received from the second resonant circuit 121 through the distribution circuit 122 and may output the specified sound.

According to one embodiment, the display 130 may further include a third resonant circuit 131 (or wireless power receiving circuit), a second impedance conversion circuit 132, a second rectifier 133, a second converter 134, and a second load unit 135. The display 130 may output the specified image by using the power transferred from the speaker 120 through the third resonant circuit 131, the second impedance conversion circuit 132, the second rectifier 133, the second converter 134, and the second load unit 135. An additional configuration for wirelessly receiving power or outputting the image may be included in the display 130, or some configuration may be omitted.

According to an embodiment, the third resonant circuit 131 may receive the second power signal 30 from the second resonant circuit 121. For example, the third resonant circuit 131 may receive the second power signal 30 by resonating at a frequency of the second power signal 30. The third resonant circuit 131 may resonate at the frequency of the second power signal 30 by adjusting values of an inductor and a capacitor.

According to one embodiment, the second impedance conversion circuit 132 may change the impedance of the third resonant circuit 131 such that the second power signal 30 received through the third resonant circuit 131 becomes a maximum. The second impedance conversion circuit 132 is connected to an output end of the third resonant circuit 131 to change the impedance of the third resonant circuit 131.

According to one embodiment, the second rectifier 133 may rectify the AC voltage input from the impedance conversion circuit 132 to generate the DC voltage. According to an embodiment, a capacitor for generating the DC voltage may be connected to the output end of the second rectifier 133.

According to one embodiment, the second converter 134 may adjust the DC voltage input from the second rectifier 133 to match the capacity of the second load unit 135. For example, the second converter 134 may adjust the level of the DC voltage and may supply the DC voltage having the adjusted level to the second load unit 135. According to an embodiment, the second converter 134 may be a DC/DC converter. According to an embodiment, the second converter 134 may output a specified DC voltage.

According to an embodiment, the second load unit 135 (or the image output unit) may output a specified image using the voltage input from the second converter 134. In other words, the second load unit 135 may output the specified image using the power repeated (or relayed) through the speaker 120.

Figure 3:
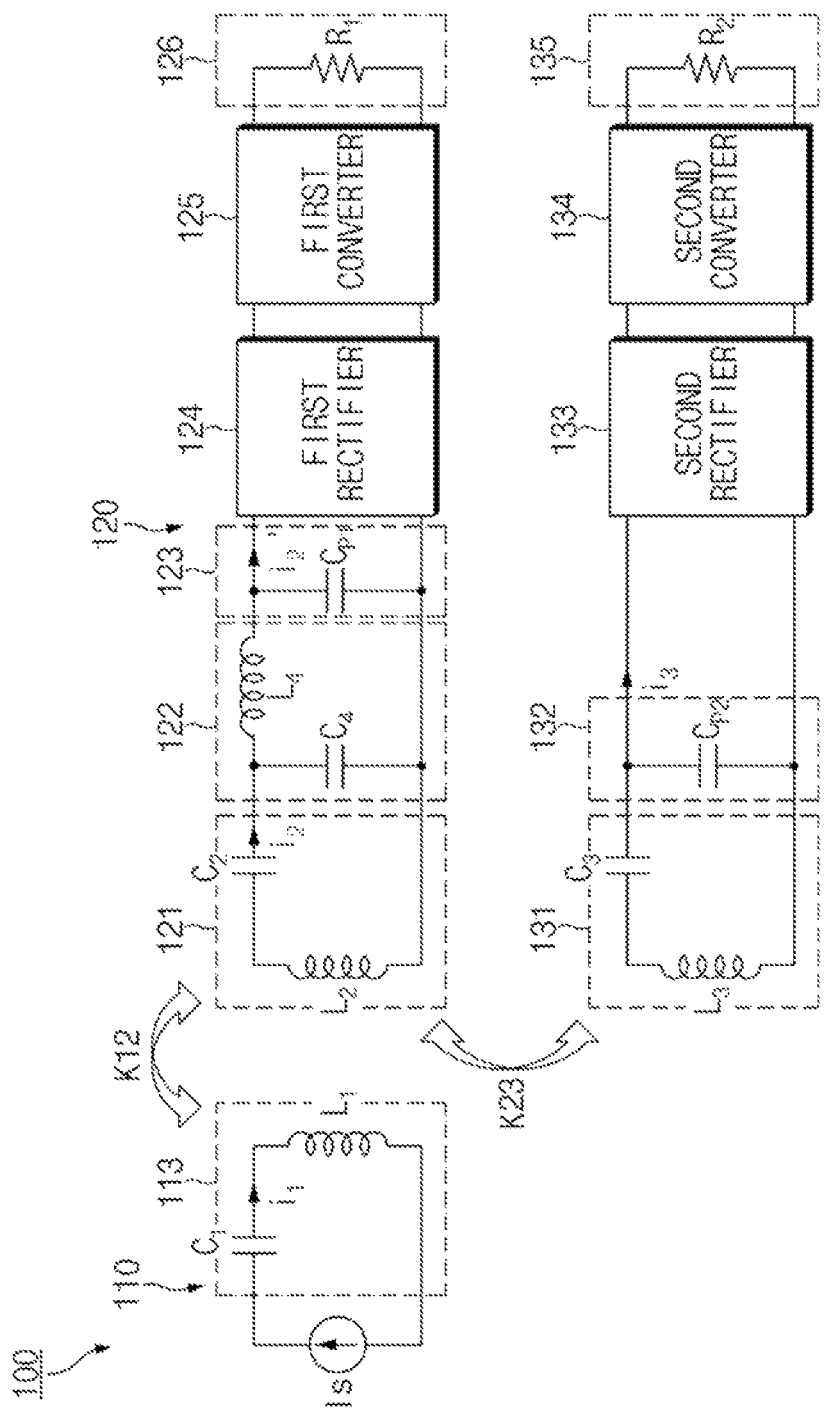
FIG. 3 is a circuit diagram of a display system according to an exemplary embodiment.

FIG. 3 is a diagram illustrating a circuit diagram of a display system according to an exemplary embodiment of the disclosure.

Referring to FIG. 3, the display system 100 may wirelessly supply power from the wireless power transmitter 110 to the display 130 using the speaker 120 as a repeater.

According to an embodiment, a specified current Is may be input to the first resonant circuit 113 of the wireless power transmitter 110. The wireless power transmitter 110 may additionally include a resonant circuit (not illustrated) for supplying the specified current Is. The resonant circuit for supplying the specified current may be connected to an input end of the first resonant circuit 113 to supply the specified current Is to the first resonant circuit 113. According to an embodiment, the first resonant circuit 113 may flow the first current i1 by the input current Is.

According to an embodiment, the first resonant circuit 113 may include a first capacitor C1 and a first inductor L1. The first capacitor C1 and the first inductor L1 may be connected, for example, in series with each other. According to an embodiment, the first resonant circuit 113 may generate a magnetic field forming the resonance point at a specified frequency through the first inductor L1 through which the first current i1 flows. Accordingly, the first resonant circuit 113 may transmit the first power signal for transmitting power to the speaker 120.

According to one embodiment, the second resonant circuit 121 of the speaker 120 may include a second capacitor C2 and a second inductor L2. The second capacitor C2 and the second inductor L2 may be connected, for example, in series with each other. According to an embodiment, the induced electromotive force may be generated by the magnetic field generated by the first resonant circuit 113 in the second inductor L2 of the second resonant circuit 121. The second inductor L2 of the second resonant circuit 121 may generate the induced electromotive force by inductively coupling (inductive coupling constant=K12) with the first inductor L1 of the first resonant circuit 113. The induced electromotive force may be generated, for example, by the second resonant circuit 121 resonating with the magnetic field generated by the first resonant circuit 113. Accordingly, a second current i2 may flow through the second resonant circuit 121 by the induced electromotive force of the second inductor L2.

According to an embodiment, the second resonant circuit 121 may output the second current i2 to the distribution circuit 122 to supply power required for the first load unit 126. Accordingly, the second resonant circuit 121 may supply a part of the power received from the wireless power transmitter 110 to a configuration (e.g., a sound output unit) inside the speaker 120.

According to one embodiment, the second resonant circuit 121 may repeat the magnetic field generated by the first resonant circuit 113. The second resonant circuit 121 may expand a range of the magnetic field generated by the first resonant circuit 113. For example, the second inductor L2 of the second resonant circuit 121 may generate a magnetic field forming the resonance point at a specified frequency by using the generated induced electromotive force. The second resonant circuit 121 may convert the received first power signal into the second current i2, and may generate the magnetic field (or the second magnetic field) by the second current i2 to transmit the second power signal of the specified frequency to the display 130. The specified frequency may be, for example, a frequency of the second current i2. Accordingly, the second resonant circuit 121 may transmit a part of the power received from the wireless power transmitter 110 to the display 130.

According to one embodiment, the distribution circuit 122 may include a resonant circuit. For example, the distribution circuit 122 may include a fourth inductor L4 and a fourth capacitor C4 that are connected in series with each other. According to an embodiment, the distribution circuit 122 may be connected to an output end of the second resonant circuit 121. The fourth inductor L4 may be connected to the second resonant circuit 121 in series, and the fourth capacitor C4 may be connected to the second resonant circuit 121 in parallel. The fourth inductor L4 may be connected to one end of the output of the second resonant circuit 121, and the fourth capacitor C4 may be connected to both ends of the output of the second resonant circuit 121. According to an embodiment, the distribution circuit 122 may output a second' current i2' using the input second current i2. In other words, the distribution circuit 122 may distribute the second current i2 output from the second resonant circuit 121 to output the second' current i2'. Accordingly, the distribution circuit 122 may output the power received through the first power signal of the wireless power transmitter 110 to the first load unit 126.

According to an embodiment, values of the fourth inductor L4 and the fourth capacitor C4 of the distribution circuit 122 may be determined according to Equation 1 below.

$$-W_S = \frac{1}{\sqrt{(L_4 * C_4)}} \quad \text{[Equation 1]}$$

The Ws may be a switching frequency, or an operating frequency of the wireless power transmitter 110. According to an embodiment, when the values of the fourth inductor L4 and the fourth capacitor C4 are determined to completely resonate with the frequency of the received first power signal, power reception efficiency and power transfer efficiency may be increased.

According to one embodiment, the value of the second capacitor C2 of the second resonant circuit 121 is determined depending on Equation 2 below when the value of the fourth inductor L4 is determined depending on Equation 1 above.

$$-W_S = \frac{1}{\sqrt{((L_2 - L_4) * C_2)}} \quad \text{[Equation 2]}$$

The Ws may be the switching frequency or the operating frequency of the wireless power transmitter 110 in the same manner as in Equation 1. A value of the second inductor L2 may be predetermined for the resonance. According to an embodiment, when the value of the second inductor L2 is determined as described above, the power reception efficiency and the power repeating efficiency may be increased.

According to an embodiment, the power distributed to the first load unit 126 (e.g., the sound output unit) through the distribution circuit 122 may vary depending on an operation of the first load unit 126 and the second load unit 135 (e.g., the image output unit) of the display 130. For example, when the first load unit consumes higher power than the second load unit 135 (e.g., outputting a loud sound), the power distributed to the first load unit 126 through the distribution circuit 122 may be increased. Accordingly, the power distributed to the display 130 (e.g., the image output unit 135) may be lowered. For another example, when the first load unit 126 (e.g., the sound output unit) consumes lower power than the second load unit 135 (e.g., outputting a small sound), the power distributed to the first load unit 126 through the distribution circuit 122 may be lowered. Accordingly, the power distributed to the display 130 may be increased. According to one embodiment, the second current i2 related to the second power signal transmitting power to the display 130 and the second' current i2' related to the operation of the first load unit 126 may be changed, based on the change. Accordingly, the first impedance conversion circuit 123, which will be described below, may adjust the impedance of the distribution circuit 122 to minimize the amount of change in the second current i2 and the second' current i2'.

According to an embodiment, the first impedance conversion circuit 123 may include a fifth capacitor CP1. The fifth capacitor CP1 may be connected to both ends of an output of the distribution circuit 122. Accordingly, the first impedance conversion circuit 123 may convert the impedance of the distribution circuit 122, and may minimize the amount of change in the second current i2 and the second' current i2' that may be changed by the operation of the first load unit 126. According to one embodiment, a value of the fifth capacitor CP1 may be determined such that the amount of change of the second current i2 and the second' current i2' that may be changed by the operation of the first load unit 126 is minimized. According to an embodiment, the capacitance of the fifth capacitor CP1 may be determined based on the output capacity of the first load unit 126. For example, the value of the fifth capacitor CP1 may be determined in proportion to the output capacity of the first load unit 126. When the output capacity of the first load unit 126 is high, the fifth capacitor CP1 having a high capacitance may be installed. In addition, when the output capacity of the first load unit 126 is low, the fifth capacitor CP1 having a low capacitance may be installed.

According to an embodiment, the first rectifier 124 and the first converter 125 may supply power to the first load unit 126 (or the sound output unit) by using the input second' current i2'. According to an embodiment, the first load unit 126 may output the specified sound by using the supplied power.

According to an embodiment, the third resonant circuit 131 of the display 130 may include a third capacitor C3 and a third inductor L3. The third capacitor C3 and the third inductor L3 may be connected, for example, in series with each other. According to an embodiment, the induced electromotive force may be generated in the third inductor L3 of the third resonant circuit 131 by the magnetic field generated by the second resonant circuit 121. The third inductor L3 of the third resonant circuit 131 may generate the induced electromotive force by inductively coupling (inductive coupling constant=K23) with the second inductor L2 of the second resonant circuit 121. The induced electromotive force may be generated based on, for example, the third resonant circuit 131 resonating with the magnetic field generated by the second resonant circuit 121. According to an embodiment, a third current i3 may flow through the third resonant circuit 131 by the induced electromotive force of the third inductor L3. Accordingly, the third resonant circuit 131 may convert the second power signal received from the speaker 120 into the third current i3.

According to an embodiment, the second impedance conversion circuit 132 may include a sixth capacitor CP2. The sixth capacitor CP2 may be connected to both ends of the output of the third resonant circuit 131. Accordingly, the second impedance conversion circuit 132 may change the third current i3 by converting the impedance of the third resonant circuit 131. According to an embodiment, a value of the sixth capacitor CP2 may be determined such that the value of the third current i3 is a maximum.

According to an embodiment, the second rectifier 133 and the second converter 134 may supply power to the second load unit 135 (or the image output unit) using the input third current i3. According to an embodiment, the second load unit 135 may output a specified image by using the supplied power.

Figure 4A:
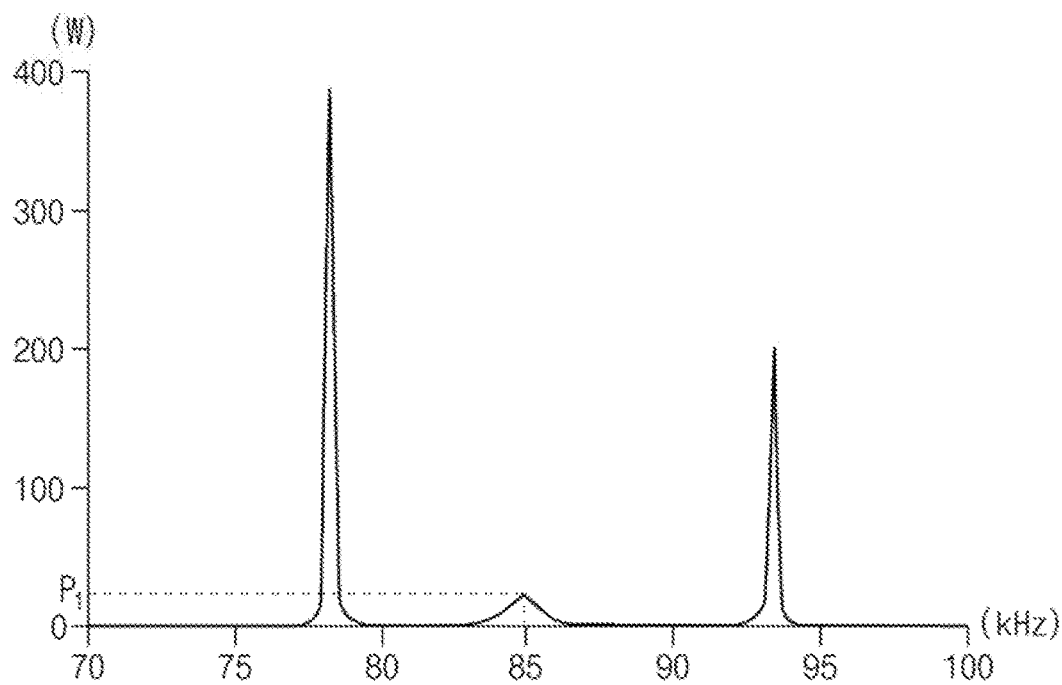
FIG. 4 is a graph illustrating power received by a speaker and a display according to an embodiment of the disclosure.
Figure 4B:
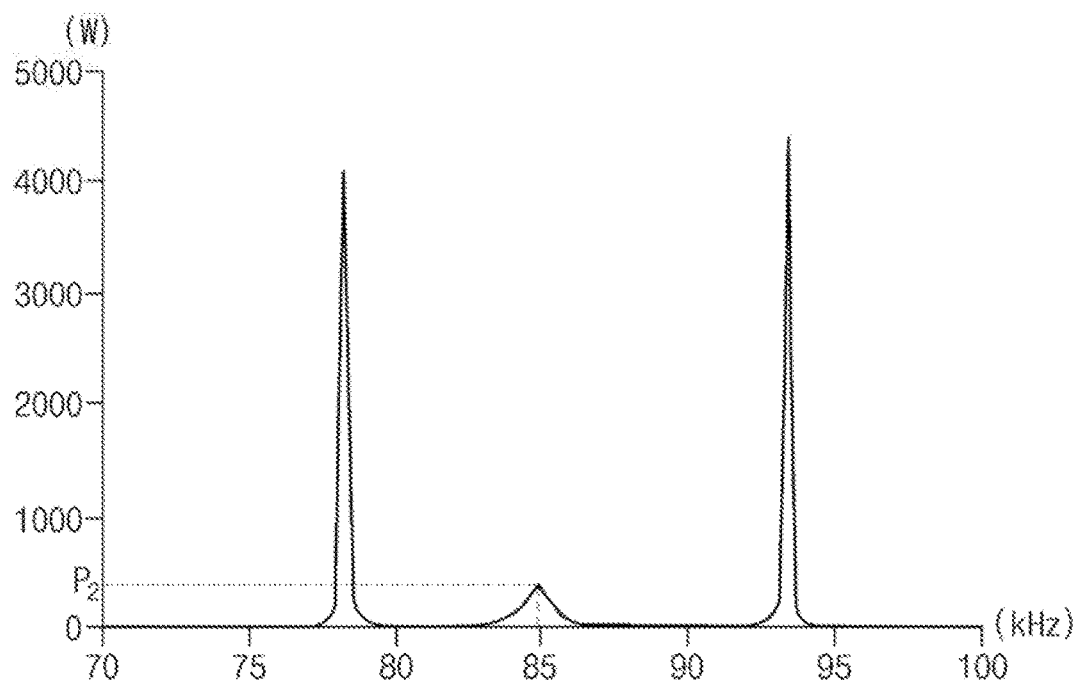

FIG. 4 is a graph illustrating power received by a speaker and a display according to an embodiment of the disclosure.

Referring to FIG. 4, in a state in which the wireless power transmitter 110, the speaker 120, and the display 130 of the display system 100 are sequentially disposed, power for performing a specified operation may be transmitted and received.

According to an embodiment, the speaker 120 and the display 130 may transmit and receive power equal to or greater than a specified magnitude for performing a specified operation in a state that is disposed to be spaced apart by a specified length from a device that receives power (e.g., the wireless power transmitter 110 or speaker 120). The speaker 120 may require, for example, power of 20 W or more to output a specified sound. The display 130 may require power of 300 W or more to output a specified image.

According to an embodiment, the speaker 120 may be disposed 50 cm apart from the wireless power transmitter 110, and the display 130 may be disposed 20 cm apart from the speaker 120. According to an embodiment, the wireless power transmitter 110 may receive the AC voltage within a specified range (e.g., 85 to 256 V) from wall power (or commercial power). According to an embodiment, the wireless power transmitter 110 may operate at an operating frequency of 85 kHz. Referring to (a), when the speaker 120 is disposed as above, 21.7 W (P1) of the power received from the wireless power transmitter 110 at a frequency near the frequency (e.g., 85 kHz) of the transmitted power may be transferred to the sound output unit. 20 W or more of power required to output the specified sound of the speaker 120 may be transferred to the load. Referring to (b), when the display 130 is disposed as above, 369 W (P2) transferred through the speaker 120 at a frequency near the frequency (e.g., 85 kHz) of the transmitted power may be transferred to the image output unit. 300 W or more of power required to output a specified image of the display 130 may be transferred to the load.

Accordingly, when the wireless power transmitter 110, the speaker 120, and the display 130 of the display system 100 are disposed as described above, power may be smoothly transmitted and received with high efficiency.

The display system 100 according to various embodiments of the disclosure described with reference to FIGS. 1 to 4 may take advantage of design (or aesthetics), by separating the display 130 that receives power wirelessly from the wireless power transmitter 110 by a specified distance or more, using the speaker 120 disposed close to the display 130 as a wireless power repeater.

In addition, the speaker 120 may smoothly repeat power to the display 130 by disposing a circuit that transfers power to perform an operation of outputting sound to the speaker 120 used as the repeater, while the speaker 120 supplies power for an internal operation.

Figure 5:
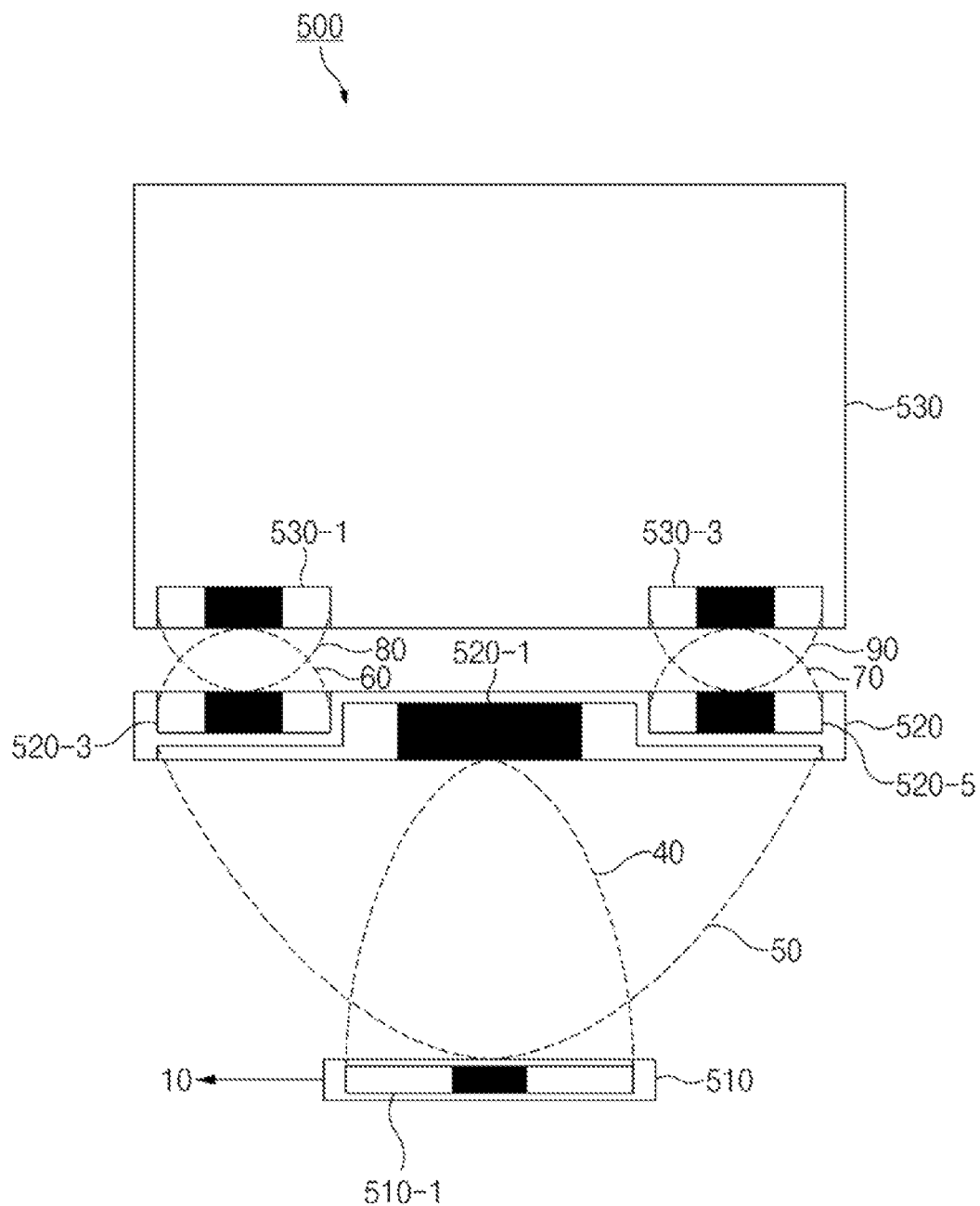
FIG. 5 is a diagram illustrating adding a coil for retransmitting power in a speaker of a display system according to an embodiment.

FIG. 5 is a diagram illustrating adding a coil for retransmitting power in a speaker of a display system according to an embodiment.

Referring to FIG. 5, a display system 500 may repeat power transmitted from a wireless power transmitter 510 through coils 520-3 and 520-5 that retransmit the received power included in a speaker 520.

According to an embodiment, the wireless power transmitter 510 may transmit power supplied from the external power source 10 to the speaker 520. For example, the wireless power transmitter 510 may transmit the first power signal to the speaker 520. According to an embodiment, the wireless power transmitter 510 may generate the magnetic field through a first coil 510-1. Accordingly, the wireless power transmitter 510 may convert the supplied power into the magnetic field (or a first magnetic field) and may transmit the first power signal to the speaker 520.

According to an embodiment, the speaker 520 may repeat power transmitted from the wireless power transmitter 510 and transmit the power to a display 530.

According to an embodiment, the speaker 520 may receive power from the wireless power transmitter 510. For example, the speaker 520 may receive the first power signal from the wireless power transmitter 510. According to one embodiment, the induced electromotive force may be generated by the magnetic field generated by the wireless power transmitter 510 in a second coil 520-1 of the speaker 520, and power may be supplied to an internal configuration of the speaker 520 depending on the generated induced electromotive force.

According to an embodiment, the speaker 520 may retransmit a part of the power received from the wireless power transmitter 510 to the display 530. For example, the speaker 520 may transmit a second power signal and a third power signal through a plurality of transmitters. According to an embodiment, the speaker 520 may form the magnetic field through the 3-1 coil 520-3 and the 3-2 coil 520-5. According to an embodiment, the speaker 520 may output a specified sound by using a part (e.g., a remaining part) of power received from the wireless power transmitter 510.

According to an embodiment, the speaker 520 may be the wireless power repeating apparatus that repeats the power signal (e.g., the first power signal) transmitted from the wireless power transmitter 510 and transmits the power signal to the display 530. In addition, the wireless power repeating apparatus may output sound included in the content. According to an embodiment, the display 530 may receive power from the speaker 520. For example, the speaker 520 may receive the second power signal and the third power signal through a plurality of receivers. According to an embodiment, the induced electromotive force may be generated by the magnetic field generated by the speaker 520 in a 4-1 coil 530-1 and a 4-2 coil 530-3 of the display 530, and power may be supplied to an internal configuration of the display 530 depending on the generated induced electromotive force. According to an embodiment, the display 530 may output a specified image by using power received from the speaker 520.

According to an embodiment, when power among the wireless power transmitter 510, the speaker 520, and the display 530 of the display system 500 is transmitted, electromagnetic interference (EMI) signals may be generated by a leakage magnetic field generated in coils. An efficiency of wireless power transmission/reception may be reduced by the EMI signals.

According to an embodiment, a first EMI signal may be generated by the first leakage magnetic field 40 of the first coil 510-1 of the wireless power transmitter 510. According to an embodiment, a second EMI signal may be generated by a second leakage magnetic field 50 of the second coil 520-1 of the speaker 520. In addition, a third EMI signal and a fourth EMI signal may be generated by a third leakage magnetic field 60 of the 3-1 coil 520-3 of the speaker 520 and a fourth leakage magnetic field 70 of the 3-2 coil 520-5 of the speaker 520. According to one embodiment, a fifth EMI signal and a sixth EMI signal may be generated by a fifth leakage magnetic field 80 of the 4-1 coil 530-1 of the display 530 and a sixth leakage magnetic field 90 of the 4-2 coil 530-3 of the display 530.

According to an embodiment, since a phase difference between a signal generated by the first coil 510-1 of the wireless power transmitter 510 and a signal generated by the second coil 520-1 of the speaker 520 is 90 degrees, there may be no interference with each other. Since a phase difference between a signal generated by the 3-1 coil 520-3 of the speaker 520 and a signal generated by the 4-1 coil 530-1 of the display 530, and a phase difference between a signal generated by the 3-2 coil 520-5 of the speaker 520 and a signal generated by the 4-2 coil 530-3 of the display 530 are 90 degrees, respectively, there may be no interference with each other. In addition, when the phase difference between the signal generated by the second coil 520-1 of the speaker 520 and the signals generated by the 3-1 coil 520-3 and the 3-2 coil 520-5 of the speaker 520 is set to 90 degrees, there may be no interference with each other.

According to an embodiment, since the first EMI signal generated from the first coil 510-1 of the wireless power transmitter 510 has a phase difference of 180 degrees compared to the third EMI signal and the fourth EMI signal generated from each of the 3-1 coil 520-3 and the 3-2 coil 520-5 of the speaker 520, the first EMI signal may be canceled out with each other. In addition, since the second EMI signal generated from the second coil 520-1 of the speaker 520 has a phase difference of 180 degrees compared to the fifth EMI signal of the 4-1 coil 530-1 and the sixth EMI signal of the 4-2 coil 530-3 of the display 530, the second EMI signal may be canceled out with each other.

Accordingly, the interference caused by the EMI signal that may occur in transmitting wireless power of the display system 500 may be canceled. In addition, a resonator having a small size may be included in the display 530 by dividing the coils 520-3 and 520-5 for a retransmission of the speaker 520 into a plurality of coils.

Figure 6:
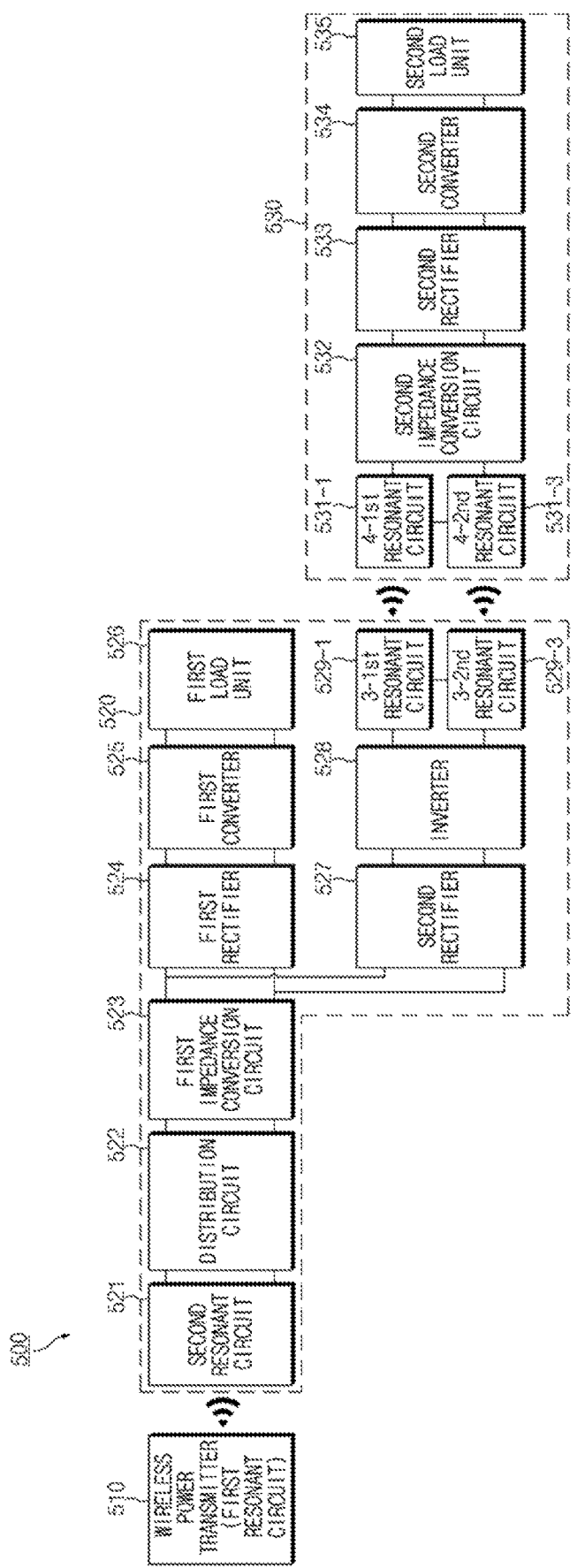
FIG. 6 is a block diagram illustrating a configuration of a display system in which a retransmission coil of a speaker is added, according to an embodiment.

FIG. 6 is a block diagram illustrating a configuration of a display system in which a retransmission coil of a speaker is added, according to an embodiment.

Referring to FIG. 6, the speaker 520 of the display system 500 may retransmit a part of the received power to the display 530.

According to an embodiment, as in the above description of the wireless power transmitter 110 of FIG. 2, the wireless power transmitter 510 may transmit the first power signal for power transmission to the speaker 520. According to one embodiment, the first EMI signal may be generated due to the first leakage magnetic field generated through the first resonant circuit (or the first wireless power transmission circuit) of the wireless power transmitter 510.

According to one embodiment, as in the above description of the speaker 120 of FIG. 2, the speaker 520 may receive the first power signal through a second resonant circuit 521 (or the first wireless power receiving circuit). The second resonant circuit 521 may convert the first power signal received from the wireless power transmitter 510 into the first current. According to an embodiment, the second EMI signal may be generated by the second leakage magnetic field generated through the second resonant circuit 521.

According to an embodiment, the speaker 520 may supply the first power signal received through a distribution circuit 522 to a first load unit 526, and a 3-1st resonant circuit 529-1 (or a second wireless power transmission circuit) and a 3-2nd resonant circuit 529-3 (or the third wireless power transmission circuit), which retransmit the power signal. For example, the speaker 520 may supply a part of the first power signal received through the distribution circuit 522 to the first load unit 526, and may supply a part of the received first power signal to the 3-1st resonant circuit 529-1 and the 3-2nd resonant circuit 529-3. In other words, the distribution circuit 522 may output the first' current by distributing the first current generated by the second resonant circuit 521. Accordingly, the distribution circuit 522 may distribute the first' current to the first load unit 526, the 3-1st resonant circuit 529-1, and the 3-2nd resonant circuit 529-3. According to one embodiment, a first impedance conversion circuit 523 is connected to the distribution circuit 522 and may convert an impedance of the distribution circuit 522 such that an amount of change in the current supplied to the first load unit 526 by the first power signal becomes a minimum. For example, the first impedance conversion circuit 523 may convert the impedance of the distribution circuit 522 such that the amount of change of the current flowing through the second resonant circuit 521 that may be changed depending on the operation of the first load unit 526, and the amount of change of the current that is transferred to the first load unit 526, the 3-1st resonant circuit 529-1, and the 3-2nd resonant circuit 529-3 become the minimum. According to an embodiment, the speaker 520 may output a specified sound through a first rectifier 524, a first converter 525, and the first load unit 526, as in the above description of the speaker 120 of FIG. 2.

According to an embodiment, unlike the speaker 120 of FIG. 2, the speaker 520 may include a second rectifier 527, an inverter 528, the 3-1st resonant circuit 529-1, and the 3-2nd resonant circuit 529-3 for retransmission. According to an embodiment, the second rectifier 527 and the inverter 528 may change the current transferred through the distribution circuit 522 into the AC current having a specified magnitude. According to an embodiment, the speaker 520 may transmit the second power signal and the third power signal through the 3-1st resonant circuit 529-1 and the 3-2nd resonant circuit 529-3, respectively. In other words, the speaker 520 may transmit power by dividing power through the 3-1st resonant circuit 529-1 and the 3-2nd resonant circuit 529-3. The 3-1st resonant circuit 529-1 and the 3-2nd resonant circuit 529-3 may be, for example, electrically connected to each other. According to one embodiment, the power distributed by the distribution circuit 522 may be converted into a third magnetic field and a fourth magnetic field and may be transmitted to the display 530. According to an embodiment, the third EMI signal may be generated by the third leakage magnetic field generated through the 3-1st resonant circuit 529-1, and the fourth EMI signal may be generated by the fourth leakage magnetic field generated through the 3-2nd resonant circuit 529-3. The third EMI signal and the fourth EMI signal, for example, may have a phase difference of 180 degrees compared to the first EMI signal generated by the first resonant circuit of the wireless power transmitter 510. Accordingly, the third EMI signal and the fourth EMI signal may be canceled out with the first EMI signal.

According to an embodiment, unlike the display 130 of FIG. 2, the display 530 may receive the second power signal and the third power signal through a 4-1st resonant circuit 531-1 and a 4-2nd resonant circuit 531-3. In other words, the display 530 may divide and receive power through the 4-1st resonant circuit 531-1 (or the second wireless power reception circuit) and the 4-2nd resonant circuit 531-3 (or the third wireless power reception circuit). The 4-1st resonant circuit 531-1 and the 4-2nd resonant circuit 531-3 may be, for example, electrically connected to each other. According to an embodiment, the 4-1st resonant circuit 531-1 and the 4-2nd resonant circuit 531-3 may convert the second power signal and the third power signal received from the speaker 520 into the third current. According to one embodiment, a fifth EMI signal may be generated by the fifth leakage magnetic field generated through the 4-1st resonant circuit 531-1, and a sixth EMI signal may be generated by the sixth leakage magnetic field generated through the 4-2nd resonant circuit 531-3. The fifth EMI signal and the sixth EMI signal, for example, may have a phase difference of 180 degrees compared to the second EMI signal generated by the second resonant circuit 521 of the speaker 520. Accordingly, the fifth EMI signal and the sixth EMI signal may be canceled with the second EMI signal.

According to an embodiment, a second impedance conversion circuit 532 may change the impedances of the 4-1st resonant circuit 531-1 and the 4-2nd resonant circuit 531-3 such that the second power signal and the third power signal received through the 4-1st resonant circuit 531-1 and the 4-2nd resonant circuit 531-3 become the maximum. According to an embodiment, the display 530 may output a specified image through a second rectifier 533, a second converter 534, and a second load unit 535.

Accordingly, the display system 500 may transmit and receive power without interference by an EMI signal. In addition, the display system 500 may reduce the size of the resonator included in the display 530 by dividing the resonator for retransmission into a plurality of resonators.

At least a portion of an apparatus (e.g., modules or functions thereof) or a method (e.g., operations) according to various embodiments of the disclosure may be implemented by instructions stored in a computer-readable storage medium in the form of a program module. When the instruction is executed by the processor, the processor may perform a function corresponding to the instruction. Computer-readable recording media include hard disks, floppy disks, magnetic media (e.g., magnetic tape), optical recording media (e.g., CD-ROM, DVD), magnetic-optical media (e.g., a floptical disc), internal memory, etc. Instructions may include code generated by a compiler or code that may be executed by an interpreter.

The embodiments disclosed herein are presented for the purpose of explanation and understanding of the disclosure, and are not intended to limit the scope of the disclosure. Accordingly, the scope of the disclosure should be construed as including all changes or various other embodiments based on the technical spirit of the disclosure.

The invention claimed is:

1. A display system comprising:
a speaker;
a display; and
a wireless power transmitter configured to convert power supplied from a power source circuit into a first magnetic field and to transmit a first power signal to the speaker,
wherein the speaker includes a wireless power transmission/reception circuit configured to convert the first power signal received from the wireless power transmitter into a first current, and to generate a second magnetic field by the first current to transmit a second power signal to a display; a distribution circuit configured to distribute power received through the first power signal to a sound output circuit by distributing the first current and outputting a second current; and the sound output circuit configured to output sound using power supplied from the distribution circuit,
wherein the display includes a wireless power reception circuit configured to convert the second power signal received from the speaker into a third current, and an image output circuit configured to output an image by using power transferred through the third current,
wherein the wireless power transmitter includes a first coil,
wherein the speaker includes a second coil, a third coil, and a fourth coil,
wherein the display includes a fifth coil, and a sixth coil,
wherein a phase difference between a first electromagnetic interference (EMI) signal which is generated by the first coil, and a third EMI signal which is generated by the third coil corresponds to 180 degrees,
wherein a phase difference between the first EMI signal, and a fourth EMI signal which is generated by the fourth coil corresponds to 180 degrees,
wherein a phase difference between a second EMI signal which is generated by the second coil, and a fifth EMI signal which is generated by the fifth coil corresponds to 180 degrees, and
wherein a phase difference between the second EMI signal, and a sixth EMI signal which is generated by the sixth coil corresponds to 180 degrees.

2. The display system of claim 1, wherein the distribution circuit includes a first resonant circuit configured to resonate at a frequency of the first power signal.

3. The display system of claim 2, wherein a capacitor of the first resonant circuit is connected in parallel with the wireless power transmission/reception circuit, and wherein an inductor of the first resonant circuit is connected in series with the wireless power transmission/reception circuit.

4. The display system of claim 1, wherein the speaker further includes an impedance conversion circuit connected to the distribution circuit and configured to convert an impedance of the distribution circuit such that an amount of change in the first current and the second current is minimum.

5. The display system of claim 4, wherein the impedance conversion circuit includes a capacitor connected in parallel to an output end of the distribution circuit, and a capacitance of the capacitor is determined based on an output capacity of the sound output circuit.

6. The display system of claim 1, wherein the wireless power transmitter includes a wireless power transmission circuit configured to generate the first magnetic field, and a resonant circuit configured to apply a specified current to the wireless power transmission circuit.

7. A display system comprising:
a speaker;
a display; and
a wireless power transmitter configured to convert power supplied from a power source circuit into a first magnetic field and to transmit a first power signal to the speaker,
wherein the speaker includes a first wireless power reception circuit configured to convert the first power signal received from the wireless power transmitter into a first current; a distribution circuit configured to distribute power received through the first power signal to a sound output circuit and a first wireless power transmission circuit by distributing the first current and outputting a second current; the sound output circuit configured to output sound using a first power distributed by the distribution circuit; and the first wireless power transmission circuit configured to convert a second power distributed by the distribution circuit into a second magnetic field to transmit a second power signal to a display, wherein the display includes a second wireless power reception circuit configured to convert the second power signal received from the speaker into a third current; and an image output circuit configured to output an image by using power transferred through the third current, wherein the wireless power transmitter includes a first coil, wherein the speaker includes a second coil, a third coil, and a fourth coil, wherein the display includes a fifth coil, and a sixth coil, wherein a phase difference between a first electromagnetic interference (EMI) signal which is generated by the first coil, and a third EMI signal which is generated by the third coil corresponds to 180 degrees, wherein a phase difference between the first EMI signal, and a fourth EMI signal which is generated by the fourth coil corresponds to 180 degrees, wherein a phase difference between a second EMI signal which is generated by the second coil, and a fifth EMI signal which is generated by the fifth coil corresponds to 180 degrees, and wherein a phase difference between the second EMI signal, and a sixth EMI signal which is generated by the sixth coil corresponds to 180 degrees.

8. The display system of claim 7, wherein the distribution circuit includes a first resonant circuit configured to resonate at a frequency of the first power signal.

9. The display system of claim 8, wherein a capacitor of the first resonant circuit is connected in parallel with the first wireless power reception circuit, and wherein an inductor of the first resonant circuit is connected in series with the first wireless power reception circuit.

10. The display system of claim 7, wherein the speaker further includes an impedance conversion circuit connected to the distribution circuit and configured to convert an impedance of the distribution circuit such that an amount of change in the first current and the second current is minimum.

11. The display system of claim 10, wherein the impedance conversion circuit includes a capacitor connected in parallel to an output end of the distribution circuit, and a capacitance of the capacitor is determined based on an output capacity of the sound output circuit.

12. The display system of claim 7, wherein the wireless power transmitter includes a wireless power transmission circuit configured to generate the first magnetic field, and a resonant circuit configured to apply a specified current to the wireless power transmission circuit.

13. The display system of claim 7, wherein the first wireless power transmission circuit includes a third resonant circuit transmitting a third power signal and a fourth resonant circuit transmitting a fourth power signal, and wherein the second wireless power reception circuit includes a fifth resonant circuit configured to convert the third power signal received from the third resonant circuit into a fifth current, and a sixth resonant circuit configured to convert the fourth power signal received from the fourth resonant circuit into a sixth current.

* * * * *